(12) United States Patent
Abdo

(10) Patent No.: US 7,822,740 B2
(45) Date of Patent: Oct. 26, 2010

(54) ESTIMATION OF INPUT/OUTPUT REQUIREMENTS FOR TABLE PROBE IN JOIN PROCESSING

(75) Inventor: Abdo Esmail Abdo, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1769 days.

(21) Appl. No.: 10/230,640

(22) Filed: Aug. 29, 2002

(65) Prior Publication Data

US 2004/0044651 A1  Mar. 4, 2004

(51) Int. Cl.
  *G06F 17/30* (2006.01)
(52) U.S. Cl. .................................. 707/714; 707/719
(58) Field of Classification Search .............. 707/1–5, 707/10, 104.1
  See application file for complete search history.

(56) References Cited

U.S. PATENT DOCUMENTS

| 5,598,559 | A | * | 1/1997 | Chaudhuri | 707/2 |
| 5,706,495 | A | * | 1/1998 | Chadha et al. | 707/2 |
| 6,032,146 | A | * | 2/2000 | Chadha et al. | 707/6 |
| 6,272,487 | B1 | * | 8/2001 | Beavin et al. | 707/2 |
| 6,516,310 | B2 | * | 2/2003 | Paulley | 702/2 |

* cited by examiner

Primary Examiner—Cam-Linh Nguyen
(74) Attorney, Agent, or Firm—Wood, Herron & Evans

(57) ABSTRACT

A join operation is costed by estimating the input/output operations (disk swaps) that will be required for retrieval of tuples from the outer and inner tables. A specific method is presented for estimating the number of input/output operations needed for given inner and outer data tables, which method models the retrieval of randomly arranged data from that table.

18 Claims, 2 Drawing Sheets

| Surname | Given Name | City | Make | Model | Year |
|---|---|---|---|---|---|
| ..... | ..... | ..... | ..... | ..... | ..... |
| Smith | Harold | Atlanta | VW | Passat | 1999 |
| ..... | ..... | ..... | ..... | ..... | ..... |
| Unger | Thomas | Boston | Nissan | Sentra | 1989 |
| ..... | ..... | ..... | ..... | ..... | ..... |
| Johnson | Donald | Chicago | Pontiac | Grand Am | 1993 |
| ..... | ..... | ..... | ..... | ..... | ..... |
| Jones | Sue | Detroit | Chrysler | Concorde | 1998 |
| Miller | Robert | Kansas City | Chevrolet | Caprice | 2000 |
| ..... | ..... | ..... | ..... | ..... | ..... |
| Nelson | Laura | Dallas | Mercedes | 190E | 1995 |
| ..... | ..... | ..... | ..... | ..... | ..... |
| Brown | Anne | Los Angeles | Toyota | Camry | 1991 |
| ..... | ..... | ..... | ..... | ..... | ..... |
| Smith | Beth | Washington | Ford | Escort | 1998 |
| ..... | ..... | ..... | ..... | ..... | ..... |

FIG. 1

| Surname | Given Name | High School |
|---|---|---|
| ..... | ..... | ..... |
| Brown | Anne | Lincoln |
| ..... | ..... | ..... |
| Johnson | Donald | Lincoln |
| ..... | ..... | ..... |
| Jones | Sue | Lincoln |
| ..... | ..... | ..... |
| Miller | Robert | Lincoln |
| ..... | ..... | ..... |
| Nelson | Laura | Lincoln |
| ..... | ..... | ..... |
| Smith | Beth | Roosevelt |
| ..... | ..... | ..... |
| Smith | Harold | Roosevelt |
| ..... | ..... | ..... |
| Unger | Thomas | Roosevelt |
| ..... | ..... | ..... |

FIG. 2A

| Make | Model | Year | Value |
|---|---|---|---|
| ..... | ..... | ..... | ..... |
| Pontiac | Grand Am | 1993 | $3,400.00 |
| ..... | ..... | ..... | ..... |
| Chevrolet | Caprice | 2000 | $16,000.00 |
| ..... | ..... | ..... | ..... |
| Toyota | Camry | 1991 | $5,400.00 |
| ..... | ..... | ..... | ..... |
| Ford | Escort | 1998 | $6,500.00 |
| ..... | ..... | ..... | ..... |
| Mercedes | 190E | 1995 | $27,000.00 |
| ..... | ..... | ..... | ..... |
| Nissan | Sentra | 1989 | $2,200.00 |
| ..... | ..... | ..... | ..... |
| VW | Passat | 1999 | $14,000.00 |
| ..... | ..... | ..... | ..... |
| Chrysler | Concorde | 1998 | $16,000.00 |
| ..... | ..... | ..... | ..... |

FIG. 2B

ESTIMATION OF INPUT/OUTPUT REQUIREMENTS FOR TABLE PROBE IN JOIN PROCESSING

FIELD OF THE INVENTION

This invention generally relates to a database management system performed by computers.

BACKGROUND OF THE INVENTION

Statistics are frequently accumulated to describe data in a database, to facilitate accesses made to the data. Statistics are typically used by an optimizer to create an access plan for accessing the data. For example, when a query seeks records meeting multiple selection criteria, or a requires a join of tables, the optimizer may determine that the results may be assembled most efficiently by applying the steps in an appropriate order, or in an appropriate manner, or by allocating memory in a particular way.

For example, consider a database table (otherwise known as a relation) including columns (otherwise known as attributes) identifying vehicle owners by name and city, and the make, model, model year and other information about their vehicles. A table of this kind is shown in FIG. 1 of the drawings, which shows just eight selected rows of a much larger relation. It should also be noted that the rows of the relation are somewhat or completely randomly organized on disk with regard to all attributes, which is typical.

Queries directed to a relational database come in a number of forms. For example, a selection query seeks rows whose attributes meet specified criteria, e.g., a query that seeks rows (otherwise known as tuples) identifying the following attribute values: surname "Smith", city name "Atlanta", and vehicle manufacturer "VW"; that is, seeking Atlantans named Smith who own VW vehicles. This query involves forming the intersection or "AND" of the results of three selection criteria, "Smith", "Atlanta", and "VW".

Another form of query is a join, which uses the content of one table to identify attributes of interest in another. For example, consider the table of FIG. 2A, which identifies the high school attended by various individuals, and the table of FIG. 2B, which identifies the current market value of various vehicles. (In both tables, only entries of interest are shown.) A user of the relational database may wish to identify the cars driven by students of, say, the "Lincoln" high school. To perform such a query, the tables of FIGS. 1 and 2A must be joined. Specifically, those tuples in the table of FIG. 2A having a high school value of "Lincoln" must be retrieved, and then used to probe the table of FIG. 1 for tuples that have a matching surname and given name.

Alternatively, a user may wish to identify the value of cars driven by the individuals in the table of FIG. 1. For this operation, the automobile identifications from the table of FIG. 1 must be used to probe the table of FIG. 2B to associate those automobiles with values.

In each join operation, there are two tables, the "outer" table, from which tuples to be matched are retrieved, and the "inner" table, which is probed for matching tuples. A query may, however, involve multiple join operations: for example, to determine the values of vehicles owned by students of "Lincoln" high school, the FIG. 2A table joined with the FIG. 1 table, and the FIG. 1 table joined with the FIG. 2B table.

A join operation is likely to require an extensive number of operations, and the efficiency with which the operation is completed may vary dramatically based upon the manner in which joins are performed, e.g., the amount of memory allocated for the join operation, the order in which values from the outer table are probed in the inner table, and, in the case of a multiple join operation, the order in which the operations are performed.

Various methods have been used for estimating the complexity, i.e., the computational cost, of a join operation. One typical costing method is to estimate the number of rows (tuples) in the outer table that will be retrieved and used to probe rows in the inner table. This estimate indicates the number of probes that will need to be made into the inner table, and thus approximates the cost of the join. Typically, one or more indeces describing the outer table are available to generate these estimates. However, this method is inaccurate, because it does not account for the manner in which data is stored in the physical implementation of the relational database system.

Unfortunately, existing methods for costing join operations suffer from a number of inaccuracies, leading to an inefficient ordering of multiple operations in the processing of a query. There remains a need of improving costing estimates of a join.

SUMMARY OF THE INVENTION

One aspect of costing a join that has as yet been insufficiently explored, is the cost of the input/output operations that are inherent in the retrieval of tuples from the outer and inner tables. Data stored by a relational database system is typically found in relatively high capacity, relatively long access time storage such as disk drives, as well as in relatively low capacity, relatively short access time storage such as memory. Because an entire database cannot typically be held in memory, memory is typically used to hold indeces and other structures that are useful in responding to queries, and hold some pages of data, which are swapped from the hard disk as part of retrievals. The actual swapping of data from hard disk to memory in order to read that data, is relatively slow and thus expensive.

In view of the different kinds of storage used for a relational database, and their dramatically varying speed, one factor that affects the speed of response to a query, is the number of swaps between memory and disk, which is directly related to memory buffer usage. The present invention, therefore, takes into account memory buffer use as part of optimizing a query.

In the typical method of responding to a query, one or more indeces are used to determine whether the outer table of the join includes the tuples matching the inner table. This initial probe of the inner table indeces is typically relatively low cost, because the indeces are typically in memory or can be read into memory in a fixed number of I/O operations. However, subsequent to this index probe, pointers taken from the indeces must be used to actually retrieve those tuples that satisfy the join from the outer and inner tables. This second step typically requires accessing disk locations, as identified by the pointers.

It will be appreciated that, because tuples are typically randomly ordered in the outer and inner tables, as each matching tuples in the inner table is retrieved, the data on disk for the inner table will be randomly accessed. This raises the possibility that pages of the inner table will be swapped from memory multiple times. If this were to occur to an excessive amount, then processing could proceed more efficiently by collecting the pointers to all matching tuples in the inner table, sorting the pointers (so that all data on the same page is accessed at the same time), and then accessing the data in the inner table sequentially. However, sorting the pointers to the inner table consumes computational resources, so sorting should only be done if the increased efficiency of retrieval more than compensates for the consumption of resources to perform the sort. Accordingly, the present invention provides a method whereby it can be determined whether the data in the inner table of a join can be more efficiently accessed by collecting and sorting pointers to that data prior to accessing the data.

It will be further appreciated that the efficiency of retrieval of data is affected by the amount of memory allocated to a join operation. Allocation of additional memory may prevent inefficient repeated retrieval of data from the outer or inner table, albeit at the expense of reducing the efficiency of other operations that are being performed at the same time. Memory allocation should therefore be increased only to the extent that it results in an increase of efficiency that justifies losses of efficiency in other operations. Accordingly, the present invention provides a method whereby it can be determined whether the data in the outer and inner tables of a join can be more efficiently accessed by allocating memory differently.

The present invention further provides a specific computation of the number of input/output operations (disk swaps) needed for a given data table, by modeling the retrieval of randomly arranged data from that table. This model has proven accurate in estimating I/O operations.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a diagram of an exemplary relation (table) identifying individuals and their automobiles;

FIG. 2A is a diagram of an exemplary relation identifying individuals and their high school;

FIG. 2B is a diagram of an exemplary relation identifying automobiles and their retail values.

DETAILED DESCRIPTION OF SPECIFIC EMBODIMENTS

Figure 3:
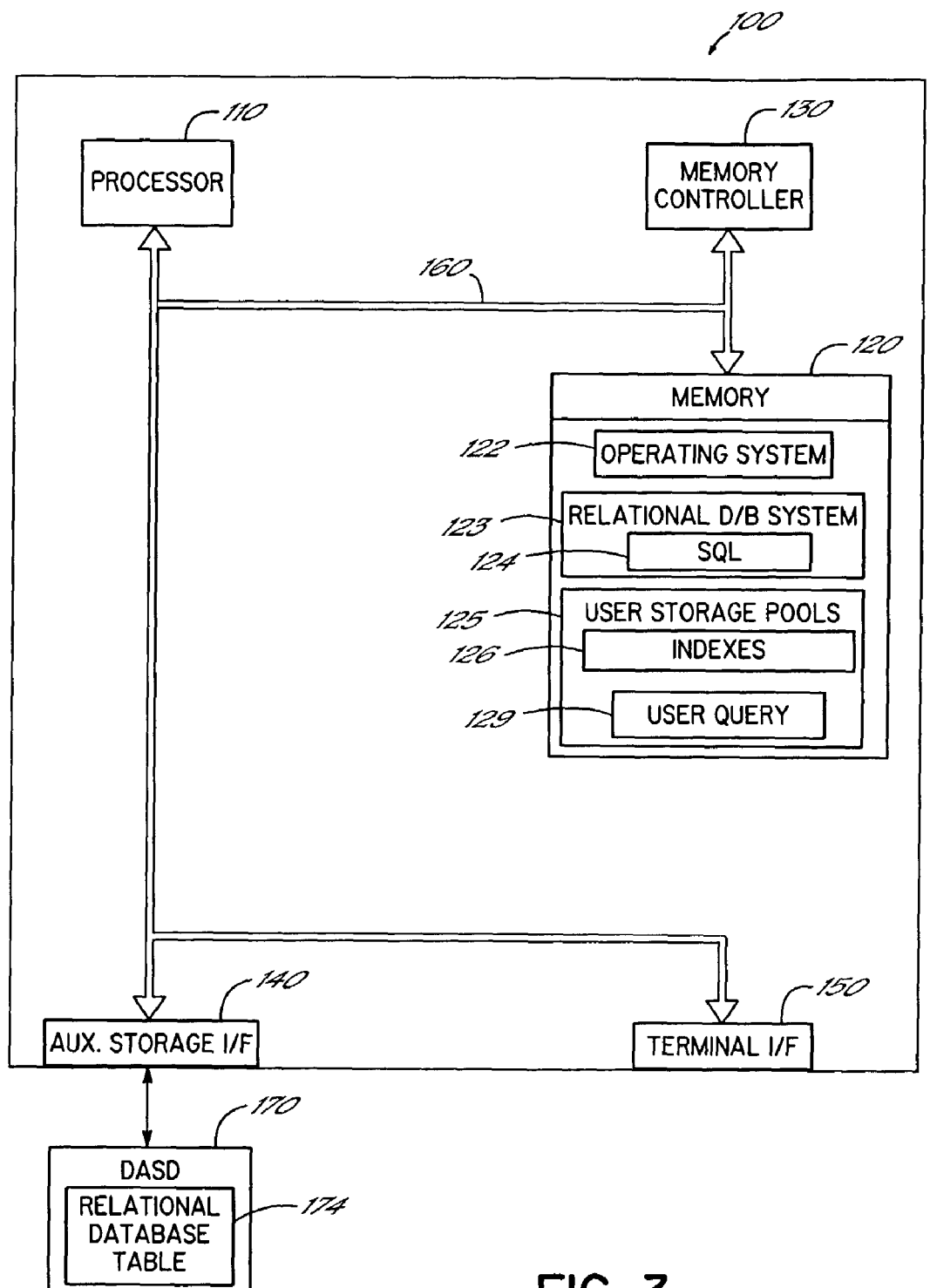
FIG. 3 is a diagram of a computer system managing a database according to an embodiment of the present invention.

The methods of the present invention employ computer-implemented routines to query information from a database. Referring now to FIG. 3, a block diagram of a computer system which can implement an embodiment of the present invention is shown. The computer system shown in FIG. 3 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 3 within the scope of the present invention such as the addition of cache memory or other peripheral devices. FIG. 3 is presented to simply illustrate some of the salient features of an exemplary computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table or relation 174 from auxiliary storage devices, such as magnetic disk (e.g., hard disks or floppy diskettes) or optical storage devices (e.g. CD-ROM). As shown in FIG. 3, one suitable storage device is a direct access storage device (DASD) 170. DASD 170 may alternatively be a floppy disk drive which may read programs and data such as relational database table 174 from a floppy disk. In this application, the term "disk" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 3 contains only a single main processor 110 and a single system bus 160, it should be understood that the present invention applies equally to computer systems having multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include indexes, as well as storage for temporary data such as a user query 129. User query 129 is a request for information from relational database table 174 stored in DASD 170. The methods of the present invention do not require that the entire relational database table be loaded into memory 120 to obtain the information requested in user query 129. Instead, indexes are loaded into memory 120 and provide relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 3, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide requests for information in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular index 127 exists that can facilitate scanning for requested data more efficiently than another database index or than the relational database housed in DASD 170. In order for an index to be useful to the methods of the present invention, the index must be built over the database fields specified by the criteria in user query 129. That is, there must be an index for those particular fields in that particular database.

The process for optimizing a join operation, can now be explained. In this process, statistics are computed for the join operation. First, statistics from the outer table for the join are collected, specifically, the number of distinct values (tuples) cO in the outer table and the total number of values (tuples) nO in the outer table. These statistics are readily available from indexes that typically are maintained in memory by a relational database system. Next, statistics from the inner table are gathered, specifically, the total number of memory pages T consumed by the inner table, the number nI of rows in the inner table, the number of distinct values cI in the joined column of the inner table, and the average number of rows p (=nI/T) in each memory page storing the inner table. Here again, these statistics are typically available from indexes that are stored in memory by a relational database system.

To optimize a join operation, an estimate is made of the number of input/output operations (disk swaps) that will need to be performed to complete the operation. The estimate is calculated using estimation formulas, based upon the factors identified in the previous steps, plus other factors, including M, the number of pages available in memory.

The estimation formula permits an estimate to be computed for the case where the joined values from the outer table are randomly ordered, and the case where the joined values from the outer table are sequentially ordered, permitting an optimizer to determine whether ordering values from the outer table will increase the efficiency of the join operation. Furthermore, the estimation formula can be recalculated for different values of M, to determine whether increasing allocated memory (increasing M) will significantly increase efficiency, or alternately whether decreasing allocated memory (decreasing M) will not significantly reduce efficiency.

The calculation formula is based upon an approximation of the probability that a given outer table value will be found in a page of the inner table that has not been previously referenced. To derive this probability, first assume that the probability that a given value will be found in a given page of the inner table, is equal to p/nI, i.e. equal to the ratio of the number of rows on a page to the total number of rows in the inner table. Accordingly, the probability that a given value will not be found on a given page of the inner table, is (1−p/nI). The probability that k values will not be found on a given page of the inner table is therefore $(1-p/nI)^k$. The probability that at least one of k values will be found on a page is therefore equal to $[1-(1-p/nI)^k]$.

Using this simplified expression for the probability that one of k values will be found on an inner table page, compute an approximation of the number of pages that will need to be retrieved to retrieve all matches of those k values in the inner table. Since each of the T pages in the inner table has a probability of $[1-(1-p/nI)^k]$ of containing one of k distinct values, the number of pages that would be expected to be retrieved to obtain all k distinct values, would be $T \times [1-(1-p/nI)^k]$. This expression can be used to derive a useful value, k', which is the number of distinct values that may be retrieved before all M available pages in memory are filled with pages from the inner table. Setting $M=T \times [1-(1-p/nI)^{k'}]$ and solving for k', we obtain:

$$k' = \frac{1}{D} \times \frac{\ln\left(1 - \frac{M}{T}\right)}{\ln\left(1 - \frac{p}{nI}\right)}. \tag{1}$$

It will be noted that the probability model described above, is built upon the assumption that the probability of a page containing a given value from the outer table is constant regardless of whether other values from the outer table have already been found on that page; this assumption is not exactly correct, in fact, the probability is stochastic; once a given value has been found on an inner table page, the probability of other values being found on that page is reduced. The actual probability that none of k values will be found on a page, must be evaluated from a series expansion, that reflects the changing probabilities of a match on a page as values of the outer table are matched. This probability may be approximated by using the largest terms of the series expansion, which results in the expression:

$$\left[\left(\left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right)\right)^k\right] \tag{2}$$

for the probability that a none of k values from the outer table will match any values on a given page of the inner table, where the constant D=nI/cI.

Using the probability formula of expression (2), an estimate of the I/O operations needed to retrieve all values from the inner table can be constructed. Specifically, based upon expression (2), the probability that at least one match of a k values from the outer table will be on a given page of the inner table, is equal to the probability of expression (2) subtracted from 1:

$$1 - \left[ \left( \left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right) \right)^k \right] \quad (3)$$

Based upon expression (3), one may compute the total number of I/O operations required for a join operation under various conditions.

One important condition that changes the computation of I/O operations, is whether there is sufficient memory to retrieve all pages from the inner table that have values matching the outer table into memory at one time. Based upon expression (1) above, this condition can be deemed met if $cO \leq k'$. If this condition is met, then one may assume that inner table pages need not be retrieved into memory more than one time. Accordingly, the number of I/O operations to retrieve all needed pages from the inner table is equal to the number of pages in the inner table containing matches for the cI distinct values from the outer table. This may be computed by multiplying expression (3) by T, setting k equal to cO:

$$\#I/Os = \quad (4)$$
$$T \times \left[ 1 - \left( \left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right) \right)^{cO} \right]$$

Equation (4) expresses the number of I/O's in the limited case where there is sufficient memory to retrieve all pages containing matching values into memory. Where this is not the case, i.e., where $k' < cO$, then a more complex analysis is required. In this situation, the number of I/O's is computed in two parts. First, I/O's must be performed to retrieve the pages for the first k' distinct values in the outer table. The number of I/O's for this part of the process can be derived from equation (4):

$$T \times \left[ 1 - \left( \left(1 - \frac{p}{nO}\right)^{(D-2)} \times \left(1 - \frac{48pnO - 24p^2 + 12pD - 12pD^2}{24nO^2 + 12nOD - 12nOD^2 + 3D^4 - 10D^3 + 9D^2 - 2D}\right) \right)^{k'} \right] \quad (5)$$

Note that expression (5) should simplify to a value very close to M, although for consistency of modeling expression (5) may be computed rather than substituting the value of M.

As noted, in the case where memory is not sufficient to hold all pages retrieved from the inner table, additional I/O's must be performed to retrieve additional pages. To estimate how many such further I/O's are needed, begin by defining a value $\psi$ as the number of values (not distinct values) in the outer table that can be processed (meaning all pages with matching values in the inner table are retrieved) before the M available pages of memory have been filled with inner table pages. This value is modeled using the same methods discussed above with reference to expression (1). Specifically, expression (1) may be modified to reflect the relationship of values in the outer table to inner table pages, by replacing T with cO, p with nO/cO, nI with nO, M with k' and k' with $\psi$. Using this model, when $$\left( k' > \left( \frac{nO}{cO \times D} \right) \right), \quad (6)$$

the parameter $\psi$ may be estimated by $$\psi = (nO) \left( 1 - \left(1 - \frac{k'}{cO}\right)^{\frac{cO}{nO}} \right), \quad (7)$$

whereas in other cases, $\psi$ may be estimated by $$\psi = \frac{\ln\left(1 - \frac{k'}{cO}\right)}{\ln\left(1 - \frac{1}{cO}\right)}. \quad (8)$$

Using these expressions for $\psi$, express the number of I/O's required to complete processing of the nO-$\psi$ values remaining in the outer table, after M pages in memory have been filled in the process of processing the first $\psi$ outer table rows (which include k' distinct values). This number of I/O's can be expressed using the probability analysis discussed above. From this analysis, use expression (4) as a model for the number of I/O's required to retrieve the inner table rows corresponding to one outer table value. This is appropriate because the pointers for each distinct value in the inner table index will be sorted such that pages in the inner table having a match for one outer table value can be efficiently (sequentially) retrieved, consistent with the assumptions of expression (4). Based upon the above derivation, the probability that a given page will be referenced by one of the nO-$\psi$ remaining values in the outer table, will then be:

$$\left( 1 - \left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right) \right)$$

Multiplying this expression by T and by (nO-ψ), i.e., by the number of pages of the inner table and the number of values to be processed from the outer table, gives an expression for the number of pages that will be referenced by the nO-ψ remaining values in the outer table.

Notably, not all pages referenced by the nO-ψ remaining values in the outer table, will need to be retrieved from storage, thus creating an I/O. Processing of a value from the outer table only creates an I/O if the page containing a matching row in the inner table is not in memory. The probability of one page in memory not being the match for a value from the outer table, can be computed by the same approximated stochastic probability expression discussed above, as:

$$\left(1 - \left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right)\right)^{\psi}$$

As this probability reflects the likelihood of an I/O for a value in the outer table, multiplying it by the previous expression of the number of pages needed for the remaining nO-ψ values from the outer table, yields the complete expression for the case k'>cO:

$$\#I/Os = T \times \left[1 - \left(\left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right)\right)^{k'}\right] +$$

$$T \times (nO - \psi) \times \left(1 - \left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right)\right) \times$$

$$\left(1 - \left(1 - \frac{p}{nI}\right)^{(D-2)} \times \left(1 - \frac{48pnI - 24p^2 + 12pD - 12pD^2}{24nI^2 + 12nID - 12nID^2 + 3D^4 - 10D^3 + 9D^2 - 2D}\right)\right)^{\psi}$$

A few additional observations are in order. First, if the values in the outer table are ordered on the joined attribute, then the retrieval of pages from the inner table will be relatively efficient; all duplicate values matching a row in a given page will be matched to that page at the same time. In such a case, the relationship of the number of I/O's to the number of values in the outer table can be modeled as linear. Based upon this assumption, the value of ψ used in the I/O computation, can be computed as $$\Psi = \frac{nO}{cO}(k' - 1) + 1.$$

This more simplified computation of ψ improves the efficiency of computing statistics with the model.

It is further notable that if D≧p, then a more accurate model of I/O's can be obtained by exchanging the values of p and D in the above formulas, i.e., each instance of D is replaced with p and each instance of p is replaced with D. The accuracy of the resulting model has been empirically validated.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the examples provided herein have been explained in the context of a database program implementing standard query language (SQL), the invention may be used in the context of a database program using any other declarative database language. The invention relates to implementation of a database program and is not limited to any particular end user language. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A computer-implemented method for generating a statistic to be used in optimizing execution of a query, for a join operation directed to an inner and an outer relation each comprising tuples, comprising
   estimating in a computer processor a number of input/output operations to an auxiliary storage device storing at least one said relation required to retrieve tuples as part of performing said join operation, based upon the arrangement of tuples within either or both of said inner and outer relations.

2. The method of claim 1 wherein said tuples of said outer relation are ordered, and said statistic reflects a number of input/output operations required to retrieve matches for ordered outer table tuples.

3. The method of claim 1 wherein said tuples of said outer relation are randomly arranged, and said statistic reflects a number of input/output operations required to retrieve matches for randomly arranged outer table tuples.

4. The method of claim 1 wherein said estimating step utilizes a number of values and distinct values in said outer relation.

5. The method of claim 1 wherein said estimating step utilizes a number of values and distinct values in said inner relation.

6. The method of claim 1 wherein said estimating step utilizes a number of memory pages consumed by the inner relation.

7. The method of claim 1 wherein said, estimating step utilizes an amount of memory available for storing pages of said outer relation.

8. The method of claim 1 wherein said estimating step comprises approximating a stochastic probability.

9. A computer system implementing a relational database system and generating a statistic to be used in optimizing execution of a query, for a join operation directed to an inner and an outer relation each comprising tuples, the computer system comprising a computer processor following a programmed sequence of steps to estimate a number of input/ output operations to an auxiliary storage device storing at least one said relation required to retrieve tuples as part of performing said join operation, based upon the arrangement of tuples within either or both of said inner and outer relations.

10. The computer system of claim 9 wherein said tuples of said outer relation are ordered, and said statistic reflects a number of input/output operations required to retrieve matches for ordered outer table tuples.

11. The computer system of claim 9 wherein said tuples of said outer relation are randomly arranged, and said statistic reflects a number of input/output operations required to retrieve matches for randomly arranged outer table tuples.

12. The computer system of claim 9 wherein said computer system utilizes a number of values and distinct values in said outer relation.

13. The computer system of claim 9 wherein said computer system utilizes a number of values and distinct values in said inner relation.

14. The computer system of claim 9 wherein said computer system utilizes a number of memory pages consumed by the inner relation.

15. The computer system of claim 9 wherein said computer system estimates a stochastic probability.

16. A program product for implementing a relational database system and generating a statistic to be used in optimizing execution of a query, for a join operation directed to an inner and an outer relation each comprising tuples, comprising a relational database, including inner and outer relations each having a plurality of tuples including values for a plurality of attributes, and relational database software performing query optimization and query execution upon said relational database, said query optimization including estimating a number of input/output operations to an auxiliary storage device storing at least one said relation required to retrieve tuples as part of performing said join operation, based-upon the arrangement of tuples within either or both of said inner and outer relations, and a nontransitory signal bearing media holding said relational database and relational database software.

17. The program product of claim 16 wherein the nontransitory signal bearing media comprises a physical transmission media.

18. The program product of claim 16 wherein the nontransitory signal bearing media comprises a physical recordable media.

* * * * *